United States Patent Office 3,163,816
Patented Dec. 29, 1964

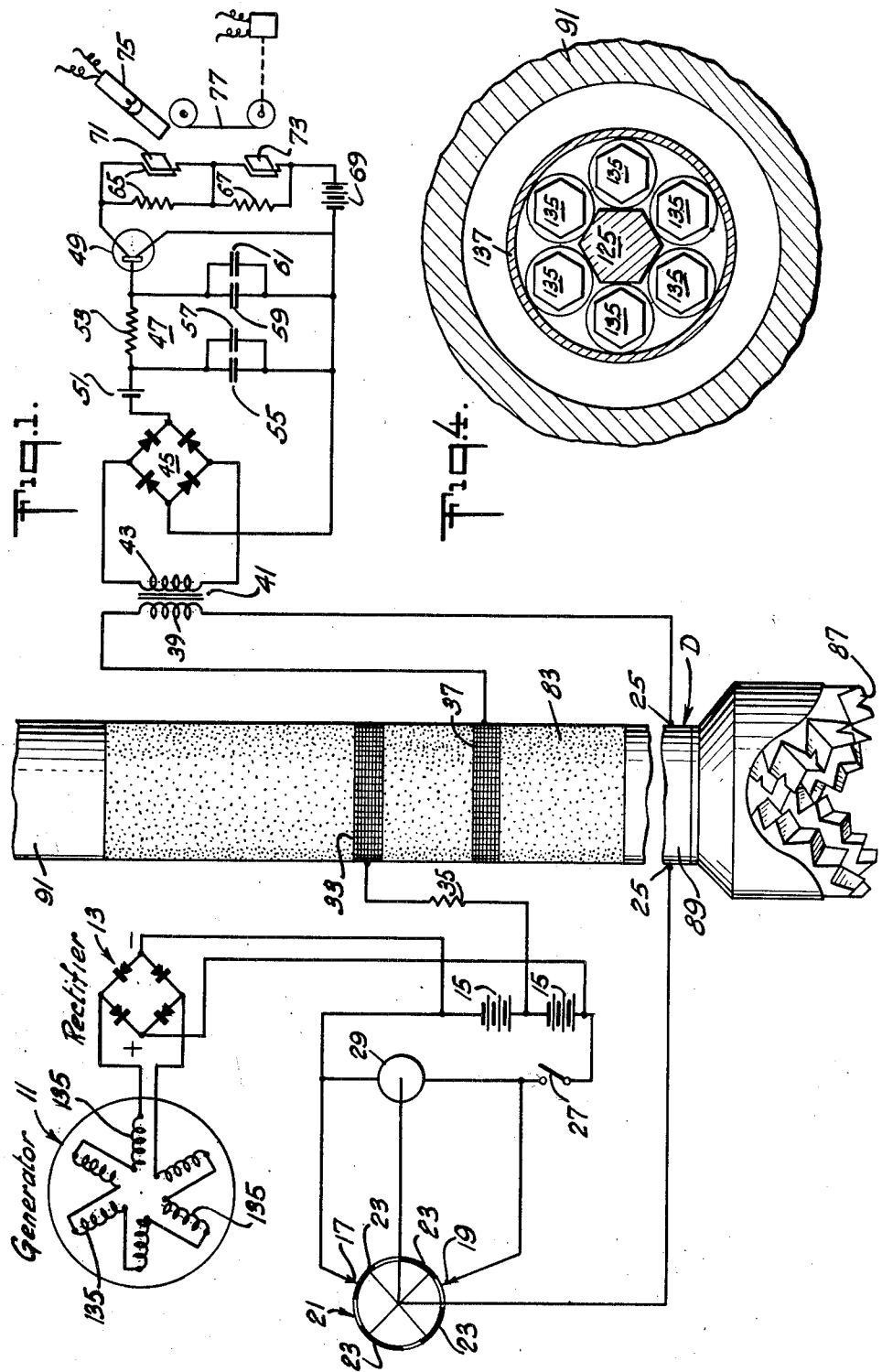
Dec. 29, 1964     R. J. CLEMENTS ETAL     3,163,816
GEOPHYSICAL PROSPECTING APPARATUS WITH FLUID OPERATED
ELECTRICAL GENERATOR FOR LOGGING WHILE DRILLING
Filed Dec. 31, 1959     3 Sheets-Sheet 1

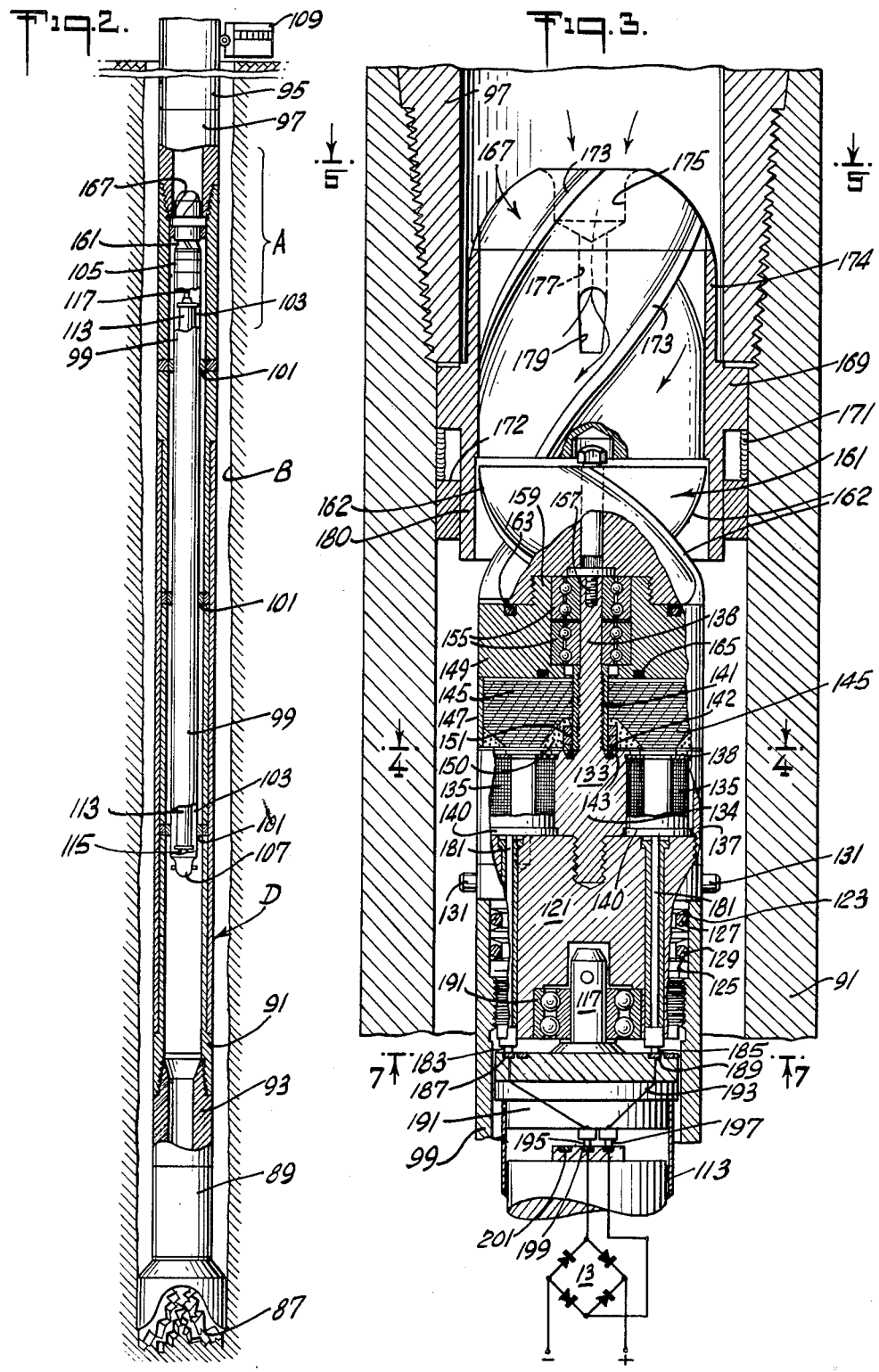

3,163,816
GEOPHYSICAL PROSPECTING APPARATUS WITH FLUID OPERATED ELECTRICAL GENERATOR FOR LOGGING WHILE DRILLING
Roy John Clements and Gerhard Herzog, Houston, and William R. McEvers, Jr., Bellaire, Tex., assignors to Texaco Inc., New York, N.Y., a corporation of Delaware
Filed Dec. 31, 1959, Ser. No. 863,156
17 Claims. (Cl. 324—1)

This invention relates to apparatus for geophysical prospecting, and more particularly to apparatus for simultaneously drilling and logging a borehole.

In the conventional method of logging a borehole the log is obtained while the drilling operation is periodically interrupted, during which period the drill pipe is removed and a logging instrument suspended by a steel shrouded multi-conductor electrical cable is lowered into the borehole. As the instrument penetrates different geological strata information in the form of electrical signals is transmitted from the bottom of the borehole to the surface through the conductor cable where it is recorded on a chart.

There are several disadvantages in using the conventional logging method. An important disadvantage is that the drilling rig must be idle while the logging crew takes over the borehole. Furthermore, during the drilling operation the drilling fluid in the borehole invades the formation around the borehole, changing the electrical characteristic of the formation. Invasion is progressive with time and may sufficiently contaminate the formation to confuse the interpretation of logs which are obtained at a considerable time after the mud begins to invade the formations. Depth control to a certain formation is difficult in that the desired strata may have been drilled through before a log is run.

In order to overcome the disadvantages encountered in the prior art methods, there has recently been developed a method of geophysical prospecting which comprises drilling a borehole, simultaneously and continuously detecting a physical variable in the hole, simultaneously and continuously recording in the hole the physical variable, and simultaneously and continuously recording the depth in the hole at which the physical variable is being detected. The method utilizes a device for logging a subsurface physical variable or parameter while drilling a borehole through the earth's formations which comprises a tubular member or housing adapted to be inserted in a conventional drill stem or string, a sealed container or pressure-tight capsule disposed within and secured to the housing and adapted and arranged to permit the passage of fluid through the housing, means disposed at least in part within the capsule for continuously detecting values of the parameter and means disposed within the capsule for continuously recording these values.

While the method and apparatus described above have operated very effectively for logging earth formations simultaneously with drilling a hole therein, the principal drawback has been the need for supplying the electrical power from a set of storage batteries within the apparatus. Such storage batteries have a relatively short life. If the drill string is not withdrawn when the batteries are exhausted, a substantial length of the hole will go unlogged as the drill progresses below the point where the batteries became exhausted.

In accordance with the present invention the difficulty discussed in the preceding paragraph has been obviated by providing an electrical generator as an integral part of the logging system located near the lower end of the drill string just above the bit. The power for driving the generator is received from the high pressure flowing stream of drilling fluid, commonly called mud, which is pumped down from the surface of the earth through the drill string and out through orifices in the bit for the purpose of lubricating the bit and carrying cuttings out of the borehole. This generator usually is employed in conjunction with storage batteries by connecting it across the batteries so as to charge them constantly during the drilling operation. However, under some circumstances, as when a constant voltage is not necessary, it can be used as the sole source of electrical power by connecting it to the load circuits directly. The former is particularly advantageous because the batteries act as voltage regulators for supplying the electrical current at a constant voltage to the operating elements of the logging tool.

The specific construction of the generator and associated equipment will be described in detail hereinafter. It should be emphasized at this point, however, that the novel apparatus is an extremely compact and simple one which can be fitted into a small diameter drill tube with ease, and yet is so constructed as to operate at the speed required to produce the necessary voltage while using the energy of the mud stream in an extremely efficient manner. Furthermore, when used in conjunction with batteries the apparatus is such as to charge the batteries constantly and to provide, as a result, a constant regulated voltage output to the electrical apparatus.

Another important aspect of the invention is the construction of the apparatus with shock-proof features such that the normally rough operation within a deep borehole will not adversely affect the delicate logging instruments within the tool, while at the same time provision is made for an uninterrupted supply of electricity from the generator to the instruments.

Still another important feature is the construction of the apparatus in such a way that the generator may be readily removed for the repair and replacement of parts, or for replacement of the generator as a whole; and to provide access to the recording mechanism of the logging instrument.

The present invention constitutes an improvement on the logging-while-drilling apparatus disclosed in more detail in copending application Serial No. 677,969 which was filed August 13, 1957, and is commonly assigned with the present application. The details of the logging apparatus, with its recording mechanism and electrodes are shown in that application and do not require repetition here. However, it is to be understood that the disclosure of the copending application is by reference incorporated herein to the extent necessary for disclosing and claiming the present invention.

In the drawings:

FIG. 1 is a schematic side elevational veiw of the lower end of a drill string incorporating logging-while-drilling features, together with an associated detailed circuit diagram of the system for generating and utilizing electricity;

FIG. 2 is a side elevational view, parts being broken away and shown in section, of a drilling tool embodying the geophysical prospecting features of the present invention, and shown within a borehole being drilled in the earth;

FIG. 3 is an enlarged longitudinal sectional view of the mud driven electrical generator which is located in the area encompassed by the bracket A in FIG. 2;

FIG. 4 is a cross-sectional view taken along the line 4—4 in FIG. 3;

Figure 5:
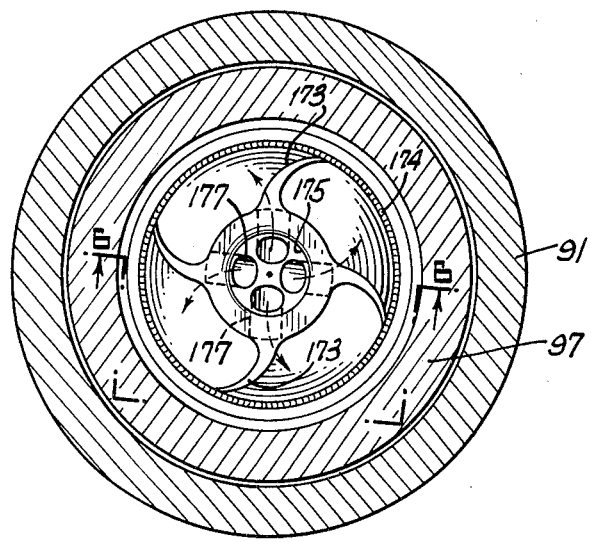
FIG. 5 is a cross-sectional view taken along the line 5—5 in FIG. 3, showing a mud stream shaper for the generator.

Referring to FIG. 1 there is shown the electrical circuit of the electrical logging equipment. This figure shows an alternating current generator 11 connected to a full-wave rectifier 13 which in turn is connected across a battery 15, preferably composed of a plurality of mercury cells. Battery 15 is connected between first and second brushes 17 and 19, respectively, of a commutator 21 having four interconnected copper segments 23 connected to a common point 25 on the drill string D, a first switch 27 being interposed between one terminal of battery 15 and the second brush 19. A motor 29 is connected across battery 15 via the switch and is coupled to drive commutator 21. The mid-point of battery 15 is connected to a current electrode 33 via a resistor 35 which has a high resistance value compared with the resistance of the earth's formations in order to supply a substantially constant current to the formations.

An external potential electrode 37 is connected to one terminal of the primary winding 39 of a transformer 41, the other terminal of the primary winding being connected to the common point 25. The secondary winding 43 of the transformer is connected between two terminals of a bridge rectifier 45, which preferably utilizes silicon diodes. A filter 47 is connected between the other two terminals or output of the bridge rectifier, the output of the filter being connected between the base and emitter electrodes of a transistor 49, for example, an NPN silicon transistor. A bias battery 51 is connected between one of the output terminals of bridge rectifier 45 and the base of transistor 49 to eliminate non-linearity at low input levels (battery 51 may be a part of main battery 15). The filter 47 which is provided to smooth out the rectified voltage from the output of bridge rectifier 45 comprises a first resistor 53 connected between the bias battery and the base of the transistor, a first pair of parallel connected capacitors 55 and 57 connected across the output of the bridge rectifier 45 and a second pair of parallel connected capacitors 59 and 61 connected across the output of the bridge rectifier 45 through resistor 53. Series resistors 65 and 67 are connected between the collector and emitter electrodes of transistor 49 through the collector supply battery 69 (which may be a part of main battery 15).

The coil of a first galvanometer 71 is connected across one of the two series resistors and the coil of a second galvanometer 73 is connected across the other of the two series resistors. A galvanometer lamp 75, for example, a surgical lamp illuminates the galvanometer mirrors which direct a light beam upon a moving photographic film 77 to provide a continuous record of the electrical logging operation, thus constituting a recording oscillograph.

To provide an electrical or resistivity log as in the disclosed embodiment of the invention, at least two electrodes must be electrically connected to two spaced points in the earth's formations. In the apparatus of this invention, one of the electrodes may conveniently be the drill stem D and therefore at least one additional electrode must be insulated from the drill stem D. In the disclosed embodiment of the invention two additional electrodes, the current electrode 33 and the potential electrode 37, are used which are insulated from the drill stem or common electrode 25 by insulation 83.

Figure 6:
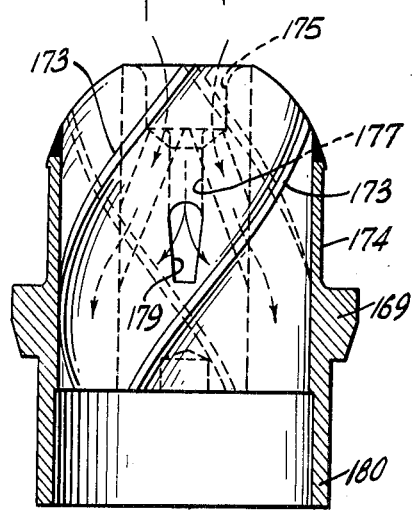
FIG. 6 is a longitudinal sectional view of the mud stream shaper taken along the line 6—6 in FIG. 5.
Figure 7:
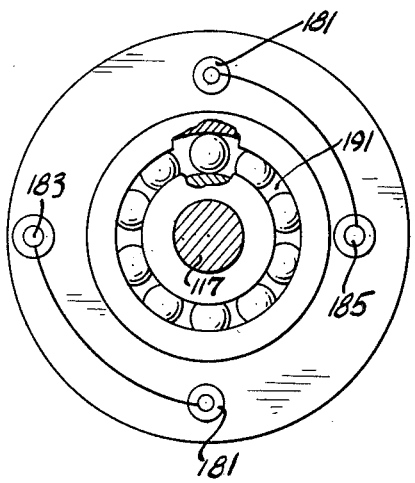
FIG. 7 is an enlarged end view, partly broken way and in section, showing the lower end of the generator as viewed from the line 7—7 in FIG. 3.

The construction of generator 11 and its location within the drilling tool will be described more specifically below in connection with FIGS. 2 to 7. FIG. 2 shows a tubular drill string D disposed in a borehole B which traverses various formations in the earth.

The lower portion of drill tube or string D includes a drill bit 87, a conventional sub 89 which is connected to the bit, a tubular housing or pipe 91, and a bottom adapter or connector sub 93 connecting the sub 89 to the housing. A drill collar 95 and a top adapter or connector sub 97 connect the housing 91 to the collar 95.

A sealed container or capsule 99 adapted to withstand pressures of 14,000 lbs. per sq. in. is disposed coaxially within the housing 91 and is rigidly secured thereto by welded radial bosses or studs 101. The capsule 99 includes a hollow cylinder 103, a top closure 105 and a bottom cap 107.

At the surface of the earth there is shown a device 109 in contact with the drill string for continuously recording the depth of the drill bit in the borehole against time, which may be of a type similar to that disclosed in U.S. Patent 2,539,758.

Disposed in the top closure 105 and bottom cap 107 are axial thrust bearings. Disposed within the pressure-tight capsule 99 is an inner case 113 including a cylinder mounted for rotation with a pair of axial support shafts 115 and 117 which are journalled in the thrust bearings. The inner case 113 is thus free to rotate independently of the drill string to substantially isolate the inner case and its contents from torsional forces and shocks affecting the drill as the drill is rotated and the borehole is deepened.

The inner case 113 contains the electrical logging equipment which includes the oscillograph (galvanometers and camera), the electrical circuitry and power source (comprising voltaic cells or storage batteries).

Now for specific details of the mud driven generator construction reference is made to FIGS. 3 to 7. Into the upper end of the capsule 99 there is threaded a lower generator body 121 provided with circumferential grooves 123 and 125 carrying two rubber O-rings 127 and 129 which are compressed against the inner wall of the capsule to provide a seal. A pair of studs 131 project radially from the lower body to engage a wrench, for installing and removing the body from the capsule.

Into the center of the upper surface of the body 121 there is threaded a longitudinally extending centerpost 133 having an enlarged hexagonal section 134 and an upwardly projecting section 136 of lesser diameter. Centerpost 133 is formed of non-magnetic metal such as K Monel metal (a nickel, copper, aluminum alloy). Around the periphery of the hexagonal section 134 are located wire coils 135 having central cores or studs of soft iron which are individually threaded into the top of the lower body 121. Flanges 138 and 140 of insulating material such as phenol formaldehyde resin or a fibreglass-epoxy resin mixture retain the wire on the studs. All of the coils are enclosed within a cylindrical sleeve 137 which is threaded over the top of the lower body, and the space within this sleeve surrounding the generator coils and the hexagonal section is filled with a solid potting material such as an epoxy resin having an alumina filler. The coils and the centerpost and the sleeve thus are quite permanently united to the lower body 121 and can be removed and replaced in the apparatus as a unit concurrently therewith.

The projecting portion 136 of the centerpost is externally threaded and carries a longitudinally extending bushing 141 having a laterally extending flange 142 on its lower end bearing against the upper end of the enlarged hexagonal section 125 and seating against an O-ring which is located within an annular groove 143 in the top of the hexagonal section. The bushing 141 is surrounded by a cylindrical six pole generator magnet 145 having poles corresponding to the generator coils, and enclosed within a hollow sleeve 147 constituting a projecting downwardly part of an upper body 149 of stainless steel. The magnet fits snugly within sleeve 147 but loosely on bushing 141 (to permit rotation of the magnets), and the space surrounding the magnet is filled with potting material 150 such as an epoxy resin containing alumina. There is also an annular mud seal 151 surrounding the lower end of the bushing 141 resting on the flange 142, and held in place by the potting material 150. The construction is such that the lower face of the magnet 145 is spaced slightly from the upper faces of the coils 135 so as to provide sufficient clearance (e.g., .016 inch) for rotation of the magnet section to generate electricity.

The upper body 149 is rotatably mounted on a pair of annular thrust bearings 155 which fit over the projecting end 127 of the centerpost 123 and are secured in place by a stud bolt 157 and cooperating flange which bears against the inner race of the upper thrust bearing.

The top of the upper body includes an externally threaded boss 159 over which is threaded an impeller 161 having a plurality of spiral vanes 162 (such as four) spiralling upwardly and sidewardly, in a clockwise direction as viewed from the top. Suitable O-ring seals 163 and 165 are provided within upper and lower annular grooves in the upper body, to stop the penetration of fluid materials such as mud and grease.

As a stream of mud flows downwardly through the drilling tool it strikes the vanes 162 of the impeller 161 and causes it to rotate whereby the magnet 145 is rotated relatively to the coils 135 and a voltage is generated in the coils.

The efficiency and speed of the operation, and the magnitude of the generated voltage are improved by a mud shaper 167 which has an annular flange 169 captured between an annular internal shoulder 171 within the logging sub and the lower end of the adaptor sub 97. A ring 172 internally welded to the tube 91 bears against the lower part of mud shaper 167 to hold it steady. The mud shaper has a rounded streamlined upper end and a plurality of spiral vanes 173 which extend upwardly and sidewardly toward the right, in a counterclockwise direction as viewed from the top. Vanes 173 fit snugly within a cylinder 174 carrying flange 169. Since the latter vanes extend in a direction opposite to those of the impeller 161, the stream of mud is divided into a plurality of separate streams flowing between the pairs of vanes and in a direction to impinge almost normally against the vanes of the impeller, thus imparting maximum force thereto. Shaping of the streams is further assisted by providing a counterbore 175 in the top of the mud shaper, from the bottom of which a plurality of smaller bores 177 lead downwardly at an angle and terminate in orifices 179 adjacent the bases of the several vanes about half way down, so as to improve the mud flow. The mud is also guided against vanes 161 by a downwardly projecting cylindrical skirt 180 surrounding impeller 162. After the mud has passed through the mud shaper and has actuated the impeller 161 it then passes down around the outside of the generator and the capsule 99 and is discharged into the borehole at the lower end of the drill string through orifices (not shown) in the drill bit 87.

As voltage is generated in the coils 135 it is transmitted therefrom through connecting wires which lead down through the lower body 121 by way of hollow bushings 181 and connect into two spring pressed electrical brushes 183 and 185 which contact collector rings 187 and 189 on the upper surface of casing 113 for transmitting electricity to the logging equipment. Rotatable inner casing 113 has an upwardly projecting shaft 117 journalled within a thrust bearing 191 which is carried within a counterbore in the bottom of the lower body 121. On the upper surface of the casing 113 the two concentric collector rings 187 and 189 are arranged within concentric annular grooves spaced at different distances from the center, one corresponding to each of the brushes 183 and 185, and suitably insulated from the casing. Thus, as the inner casing 113 rotates independently of the drilling tool, the electrical brushes are in constant electrical contact with the collector rings. In turn, the collector rings 187 and 189 are connected by way of conductors 191 and 193 to a second set of two brushes 195 and 197 which are in contact with a central conductor 199 and an annular collector ring 201 located within the inner casing and coupled in turn to rectifier 13. This latter arrangement is primarily required for proper assembly of the apparatus by means of screw threaded connections, and has nothing to do functionally with the rotation of the apparatus in use.

When the drill string has been withdrawn from a borehole, access to the logging instrument and its recording mechanism is obtained by first unscrewing sub 91 from sub 97 and removing mud shaper 167. Then a wrench is inserted to grip studs 131 and the generator assembly is rotated as a unit to unscrew lower body 121 from capsule 99, whereupon the generator unit is lifted out of the sub 91 leaving inner case 113 unsupported at the top. Inner case 113 is then lifted out and disassembled and the photographic record 77 withdrawn for developing.

The generator unit may be disassembled for servicing by removing stud bolt 157 and unscrewing impeller 161 from boss 159; and by lifting off the magnet unit including upper body 149 and associated magnets from bushing 141. If the coils and magnets must be serviced, the epoxy resin potting material can be dug out to free them.

The apparatus described in detail above has been constructed and found to be extremely valuable because of its compactness and simplicity, and because of its efficiency. Compactness is of particular importance when it is considered that this mud driven generator has been installed within a tubular sub having an external diameter of only eight inches.

While the generator has been described as one having stationary coils and rotating magnets, it should be evident that the principles also apply when the coils are rotating and the magnets are stationary, the principal difference being that an additional set of brushes and collector rings must be provided with this construction.

The logging feature of the invention has been described as applied to resistivity logging of the formations. It should be apparent that when logging by other means, such as detecting radioactivity or logging sonically, the construction for generating electricity and using it either directly, or for charging batteries, is of great value for operating detecting and recording apparatus.

Obviously many modifications and variations of the invention, as hereinbefore set forth, may be made without departing from the spirit and scope thereof, and therefore only such limitations should be imposed as are indicated in the appended claims.

We claim:

1. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; said drill tube having an elongated principal axis extending through said drill tube substantially along the direction of flow of said drilling fluid therethrough; an impeller in said tube in the line of flow of such fluid and rotatable in response to force exerted thereon by said fluid; an electrical generator comprising a stationary first body having a shaft projecting therefrom, a second body rotatably mounted to said shaft, magnet means arranged and disposed to provide a first surface generally in a first plane extending transversely of said principal axis of said drill tube, and coil means arranged and disposed to provide a second surface generally in a second plane extending transversely of said principal axis of said drill tube and spaced longitudinally from said first plane, said first surface defining the adjacent surfaces of said magnet means and said coil means, said magnet means comprising means for producing a magnetic flux extending through said second surface into said coil means whereby relative rotational movement of said coil and magnet means is capable of generating electricity in said coil means, one of said means being included in said second body and rotatable therewith, the other of said means being included in said stationary first body; said impeller being mechanically coupled to said second body; a load circuit; and electrical conductors leading from said coil means to said load circuit.

2. In apparatus in accordance with claim 1, a fluid flow directing device positioned in said tube above said impeller, said device being so constructed and arranged as to cause such fluid to flow angularly with respect to the axis of said tube against said impeller for actuating said impeller.

3. Apparatus in accordance with claim 2, said impeller having angularly disposed vanes, and said directing device having passages disposed angularly, but opposite said vanes for directing fluid streams approximately normally against said vanes.

4. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; an impeller in said tube in the line of flow of such fluid and rotatable in response to force exerted thereon by said fluid; an electrical generator comprising a stationary first body having a shaft projecting therefrom, a second body rotatably mounted to said shaft, magnet means arranged in a first plane extending transversely of said drill tube, and coil means arranged in a second plane extending transversely of said drill tube and spaced longitudinally from said first plane, one of said means being included in said second body and rotatable therewith, the other of said means being included in said stationary first body; said impeller being mechanically coupled to said second body; a load circuit; and electrical conductors leading from said coil means to said load circuit; said apparatus also comprising a hollow capsule non-rotatably mounted within said drill tube, and an inner case member containing said load circuit rotatably mounted within said capsule and journalled at the opposite ends thereof to permit free rotation, the upper end of said inner case member being journalled in said stationary body member; and means for conducting electricity from said generator to said load circuit while said inner case member is rotating with respect to said stationary body member, said last-named means comprising brush means on one of said members and conductor means on the other of said members in contact with said brush means.

5. In apparatus in accordance with claim 4, said brush means comprising a pair of brushes carried by said stationary body and arranged at different distances from the longitudinal axis of said generator, and two collector rings arranged on the end surface of said inner case at different distances from said longitudinal axis corresponding to positions of said two brushes whereby one of said brushes is in contact with one collector ring and the other of said brushes is in contact with the other collector ring.

6. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; an impeller in said tube in the line of flow of such fluid and rotatable in response to force exerted thereon by said fluid; an electrical generator comprising a stationary first body having a shaft projecting therefrom, a second body rotatably mounted to said shaft, magnet means arranged in a first plane extending transversely of said drill tube, and coil means arranged in a second plane extending transversely of said drill tube and spaced longitudinally from said first plane, one of said means being included in said second body and rotatable therewith, the other of said means being included in said stationary first body; said impeller being mechanically coupled to said second body; a load circuit; and electrical conductors leading from said coil means to said load circuit; a fluid flow directing device positioned in said tube above said impeller, said device being so constructed and arranged as to cause such fluid to flow angularly with respect to the axis of said tube against said impeller for actuating said impeller; said apparatus also comprising a hollow capsule non-rotatably mounted within said drill tube, and an inner case member containing said load circuit rotatably mounted within said capsule and journalled at the opposite ends thereof to permit free rotation, the upper end of said inner case member being journalled in said stationary body member; and means for conducting electricity from said generator to said load circuit while said inner case member is rotating with respect to said stationary body member, said last-named means comprising brush means on one of said members and conductor means on the other of said members in contact with said brush means.

7. In apparatus in accordance with claim 1, said load circuit including electrical battery means operatively connected to a logging circuit, said electrical generator being connected to said battery means for charging said battery means during the drilling of a borehole.

8. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; an impeller in said tube in the line of flow of such fluid and rotatable in response to force exerted thereon by said fluid; an electrical generator comprising a stationary first body having a shaft projecting therefrom, a second body rotatably mounted to said shaft, magnet means arranged in a first plane extending transversely of said drill tube, and coil means arranged in a second plane extending transversely of said drill tube and spaced longitudinally from said first plane, one of said means being included in said second body and rotatable therewith, the other of said means being included in said stationary first body; said impeller being mechanically coupled to said second body; a load circuit; and electrical conductors leading from said coil means to said load circuit, said load circuit including electrical battery means operatively connected to a logging circuit, said electrical generator being connected to said battery means for charging said battery means during the drilling of a borehole; said apparatus also comprising a hollow capsule non-rotatably mounted within said drill tube, and an inner case member containing said load circuit rotatably mounted with said capsule and journalled at the opposite ends thereof to permit rotation, the upper end of said inner case member being journalled in said stationary body member; and means for conducting generated electricity from said generator to said load circuit while said inner case member is rotating with respect to said stationary body member, said last-named means comprising brush means on one of said members and conductor means on the other of said members in contact with said brush means.

9. In apparatus in accordance with claim 1, said generator comprising a stationary lower body detachably secured within said drill tube, a plurality of generator coils on the upper face of said lower body, a shaft projecting upwardly from said lower body, a rotatable upper body rotatably mounted on said shaft, and magnet means on the lower face of said upper body, and said impeller being detachably secured to said upper body at the upper end thereof, said generator being detachably mounted in said drill tube, whereby the generator can be removed from said drill tube for repair or replacement.

10. In apparatus in accordance with claim 9, a fluid flow directing device removably positioned in said tube above said impeller.

11. In apparatus in accordance with claim 9, said electrical generator including a stationary body member; said apparatus also comprising a hollow capsule non-rotatably mounted within said drill tube, an inner case member containing said load circuit rotatably mounted within said capsule and journalled at the opposite ends thereof to permit free rotation, the upper end of said inner case member being journalled in said stationary body member; and means for conducting electricity from said generator to said load circuit while said inner case member is rotating with respect to said stationary body member, said last-named means comprising brush means on one of said members and conductor means on the other of said members in contact with said brush means.

12. Apparatus for drilling a borehole through earth formations and concurrently logging a physical characteristic comprising, in combination, a drill tube having a bit on one end thereof and an outlet for drilling fluid adjacent said bit, said drill tube having a principal axis and being adapted to conduct a stream of drilling fluid generally along said principal axis therethrough; an impeller in said tube in the line of flow of such fluid and rotatable in response to force exerted thereon by said fluid; an electrical generator operatively connected to said impeller for operation thereby; said generator comprising magnet means and coil means having respective adjacent surfaces in adjacent planes generally transverse to the principal axis of said drill tube, said coil means being fixedly mounted in said drill tube, said magnet means being rotatably mounted in said drill tube and being operatively coupled to said impeller for rotation therewith, said magnet means providing an electrical flux extending into said coil means whereby rotation of said magnet means relative to said coil means is capable of generating an electrical current in said coil means; and means defining a fluid flow directing device positioned in said tube above said impeller, said flow directing device comprising a plurality of generally spiral shaped fins spaced from one another to provide generally spiral passages for said fluid directed to said impeller, thereby to cause such fluid to flow angularly with respect to the axis of said tube against said impeller for actuating said impeller.

13. Apparatus for drilling a bore hole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; an electrical generator located within said drill tube and having a stationary body; a hollow capsule non-rotatably secured within said drill tube below said generator; an inner case freely rotatably mounted within said capsule and journalled at opposite ends thereof, said inner case containing a load circuit; the upper end of said inner case being journalled in said stationary body; and stationary brush means and rotating conductor means associated with said stationary body and said rotatable inner case, respectively, and in contact with one another for conducting electricity from said generator to said load circuit.

14. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; logging apparatus mounted in said drill tube, means for supplying electric power to said logging apparatus comprising an electrical generator in said tube, an impeller in said tube in the line of flow of said drill fluid and rotatable in response to force exerted thereon by said fluid; said impeller being operatively connected to said electrical generator said generator comprising a stationary generator body including annularly arranged stationary generator coil means and a central shaft projecting therefrom, a rotatable body rotatably mounted upon said shaft, said rotatable body including magnet means for generating an electric current in said coil means when rotated on said shaft, said impeller being mechanically coupled for rotating said rotatable body in response to the flow of said drill fluid in said tube, said stationary generator body including a first cylindrical sleeve, said stationary generator coil means comprising a plurality of coil elements potted in said first sleeve, said rotatable body comprising a second cylindrical sleeve rotatably mounted upon said shaft and containing said magnet means potted therein, said magnet means comprising a plurality of magnet elements contained within said second sleeve and potted therein.

15. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; a stationary generator body detachably mounted within said tube; annularly arranged stationary generator coil means mounted in a first cylindrical sleeve and potted therein, said first sleeve being detachably secured to said body; a central shaft projecting upwardly from said body; magnet means including a body rotatably mounted upon said shaft above said coil means, said magnet means comprising a plurality of annularly arranged magnet elements potted within a second cylindrical sleeve, said magnet body being detachable from said shaft; and an impeller detachably secured on the top of said rotatable magnet means; said generator assembly being detachably mounted in said drill tube, whereby the generator assembly can be removed from said drill tube for repair and replacement of parts.

16. Apparatus as defined in claim 1 wherein said coil means and said magnet means are mounted in said stationary body and rotatable body respectively by means of an epoxy resin potting material.

17. Apparatus for drilling a borehole through earth formations and concurrently logging a physical characteristic comprising, in combination, a drill tube having a bit on one end thereof and an outlet for drilling fluid adjacent said bit, said drill tube being adapted to conduct a stream of drilling fluid therethrough; logging apparatus mounted in said drill tube, means for supplying electric power to said logging apparatus comprising an electrical generator in said tube, an impeller in said tube in the line of flow of said drill fluid and rotatable in response to force exerted thereon by said fluid; said impeller being operatively connected to said electrical generator, said generator comprising a stationary generator body including annularly arranged stationary generator coil means and a central shaft projecting therefrom, a rotatable body rotatably mounted upon said shaft, said rotatable body including magnet means for generating an electric current in said coil means when rotated on said shaft, said impeller being mechanically coupled for rotating said rotatable body in response to the flow of said drill fluid in said tube, said stationary body being mounted to the top of said logging apparatus mounted in said drill tube, said rotatable body being mounted above said stationary body, and the mating surfaces of said upper and lower bodies having substantially flat opposed surfaces.

References Cited in the file of this patent

UNITED STATES PATENTS

| | | |
|---|---|---|
| 2,371,193 | Sigmund et al. | Mar. 13, 1945 |
| 2,524,031 | Arps | Oct. 3, 1950 |
| 2,545,688 | Critchfield et al. | Mar. 20, 1951 |
| 2,700,131 | Otis et al. | Jan. 18, 1955 |
| 2,743,375 | Parker | Apr. 24, 1956 |
| 2,873,395 | Kober | Feb. 10, 1959 |
| 3,023,334 | Burrebal | Feb. 27, 1962 |